July 3, 1934.     J. K. BABLES     1,965,484
RESILIENT WHEEL
Filed June 1, 1933
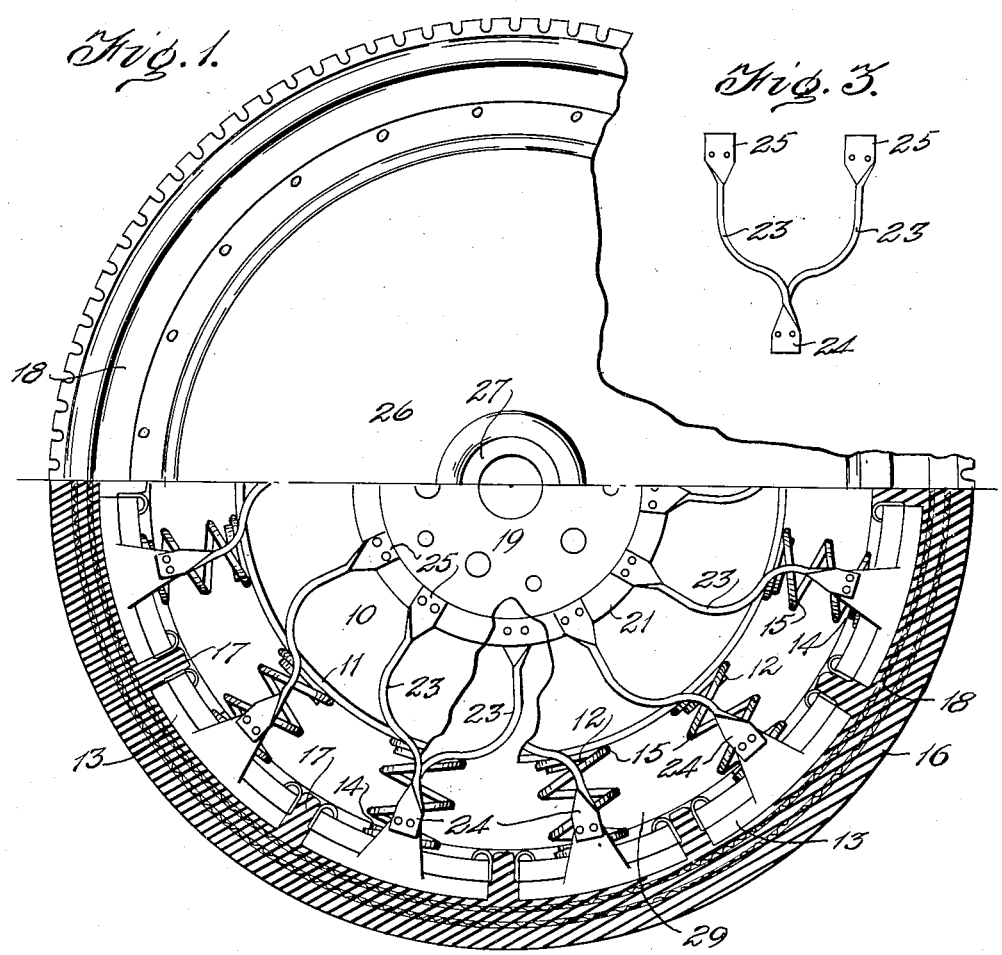
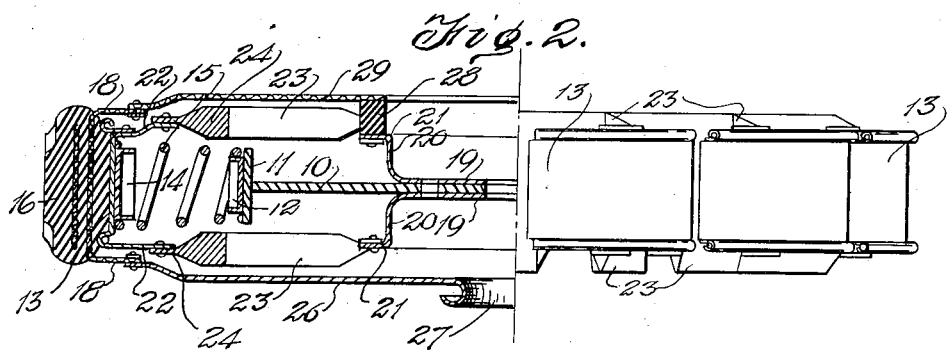
INVENTOR
John K. Bables
BY Albert Popkins
ATTORNEY.

Patented July 3, 1934

1,965,484

UNITED STATES PATENT OFFICE 1,965,484

RESILIENT WHEEL

John K. Bables, Houston, Tex.

Application June 1, 1933, Serial No. 673,908

4 Claims. (Cl. 152—29)

This invention relates to vehicle wheels and has special reference to a spring or resilient wheel.

One important object of the invention is to provide an improved wheel of this character in which the usual pneumatic tread and tube are eliminated. The second important object of the invention is to provide a novel wheel of this character wherein no detachable metal rim for the rubber tire, used herewith, is necessary, the construction being such that the rubber tire is fitted directly on certain spring supported members.

The third important object of the invention is to provide an improved center construction for such wheels.

A fourth important object of the invention is to provide an improved spring arrangement in such wheels.

With the above and other objects in view, the invention consists in general of certain novel details of construction and combinations of parts hereinafter further described, illustrated in the accompanying drawing and specifically claimed.

In the accompanying drawing like characters of reference indicate like parts in the several views, and:—

Figure 1 is a side view of my improved wheel, the view being partly in elevation and partly in section and having a portion of the part in elevation broken away.

Figure 2 is an edge view of the wheel, one-half being shown in radial section while the other half is shown in elevation with the tire removed.

Figure 3 is a detailed view of a pair of certain springs used herewith.

In the embodiment of the invention here shown there is provided a center plate 10 having a peripheral flange 11 projecting equally on both sides of the plate 10. Spaced around the flange 11 is a series of cup-shaped spring seats 12 and opposite each of these spring seats is an arcuate channel member 13 provided with a spring seat 14 centrally of its inner face and coiled compression springs 15 are located between the sectional rim members 13 and the flange 11, each spring seating on the respective spring seats 12 and 14 as can readily be seen by reference to Figure 2. A solid rubber tire 16 is seated in the channel sections 13 of the rim and between adjacent sections 13 there is provided a rubber spacing member 17 so that the sections 13 are held evenly spaced within the tire 16. This tire 16 has the usual wire fabric reenforcing and one of the wire fabric strips has its edges extending through the rubber to project inwardly and laterally of the tire as shown at 18. Obviously, since the tire is received in channel like members and since these are capable of yielding inwardly by the compression of the springs 15, it is possible to fit the tire in position without the need of a detachable rim, being merely necessary to force the tire over the flanges of the channel members 13.

At each side of the plate 10 and at the central portion thereof there is a side plate 19 having a peripheral flange 20 extending away from the plate 10. The outer edge of each flange 20 is provided with a further flange 21 projecting parallel to the plate 10. Each of the members 13 is provided with a pair of spaced inwardly projecting ears 20 and reversely curved leaf springs 23 have ends twisted at right angles to the body of the spring so that one end of each spring, as at 24 may be secured to a respective ear 22 while the other end 25 of said spring is secured to the flange 21, rivets being preferably used for this purpose. Thus at each side of the plate 10 there is a series of the leaf springs 23, but it is to be noted that the springs at one side of the wheel are curved oppositely to the springs on the other side of the wheel so that provision is made for driving the outer part of the wheel in either direction. This arrangement can be seen at the lower part of Figure 1 where a portion of the wheel is broken away to show the rear side.

Covering one side of the wheel is a metallic cover plate 26 having an appropriate axle opening 27 centrally thereof and the edge portion of this plate is secured by rivets or the like to the fabric 18 at one side of the wheel. Mounted on the flange 21 at the opposite side of the wheel is a rubber ring 28 to which is attached the inner edge of an annular fabric member 29 which forms the cover for the springs on this side of the wheel and which is connected at its outer edge to the fabric ring. By means of this construction the springs are protected from dirt and dust by the covers while the movement of the tire 16 is not prevented since the fabric 18 which connects the tire to the cover members will yield sufficiently to permit proper movement of the tire.

There has thus been provided a simple and efficient device of the kind described and for the purpose specified.

It is obvious that many minor changes may be made in the form and construction of the invention without departing from the essence thereof. It is not therefore desired to confine the invention to the exact form herein shown and described but it is wished to include all such as properly come within the scope claimed.

For instance while but two reenforcing strips have been shown in the present disclosure, I may preferably use 3 plies of fabric and one of wire mesh vulcanized in the rubber pad resting on the parts 13.

What is claimed, is:—

1. In a wheel of the kind described, a center member, a sectional rim consisting of a series of spaced arcuate members, a radially disposed coiled compression spring between each arcuate member and the center member, lateral members carried by the center member, a pair of reversely curved leaf springs secured to each arcuate member at one end and to a lateral member at the other end, and said lateral members each having a radial flange to which the leaf springs are connected and the arcuate members each having a pair of centrally disposed lateral ears for connecting said leaf springs.

2. In a wheel of the kind described, a center member, a sectional rim consisting of a series of spaced arcuate members, a radially disposed coiled compression spring between each arcuate member and the center member, lateral members carried by the center member, a pair of reversely curved leaf springs secured to each arcuate member at one end and to a lateral member at the other end, the leaf springs attached to one lateral member being curved in opposition to the leaf springs attached to the other lateral member, and said lateral members each having a radial flange to which the leaf springs are connected and the arcuate members each having a pair of centrally disposed lateral ears for connecting said leaf springs.

3. In a wheel of the kind described, a center member, a sectional rim consisting of a series of spaced arcuate members, a radially disposed coiled compression spring between each arcuate member and the center member, lateral members carried by the center member, a pair of reversely curved leaf springs secured to each arcuate member at one end and to a lateral member at the other end, said lateral members each having a radial flange to which the leaf springs are connected and the arcuate members each having a pair of centrally disposed lateral ears for connecting said leaf springs, and said arcuate members each having a channel at its outer face, and a rubber tire seated in said channels.

4. In a wheel of the kind described, a center member, a sectional rim consisting of a series of spaced arcuate members, a radially disposed coiled compression spring between each arcuate member and the center member, lateral members carried by the center member, a pair of reversely curved leaf springs secured to each arcuate member at one end and to a lateral member at the other end, the leaf springs attached to one lateral member being curved in opposition to the leaf springs attached to the other lateral member, said lateral members each having a radial flange to which the leaf springs are connected and the arcuate members each having a pair of centrally disposed lateral ears for connecting said leaf springs, said arcuate members each having a channel at its outer face, and a rubber tire seated in said channels.

JOHN K. BABLES.